United States Patent Office 3,442,807
Patented May 6, 1969

---

3,442,807
NOVEL BORON ESTERS AND STABILIZATION
OF OXIDIZABLE ORGANIC SUBSTANCES
THEREWITH
Derek A. Law, Pitman, N.J., assignor to Mobil Oil
Corporation, a corporation of New York
No Drawing. Filed Dec. 19, 1966, Ser. No. 602,504
Int. Cl. B01j 1/16; C10m 1/54, 5/28
U.S. Cl. 252—46.3                  18 Claims

---

ABSTRACT OF THE DISCLOSURE

Organic base media subject to oxidative deterioration are stabilized by the presence of heterocyclic aromatic oxygenboron-nitrogen, preferably reaction products of borate esters and salicylaldimine or hydroxyquinoline.

---

This invention has to do with novel organic compositions and, in particular, this invention relates to additives for organic compositions which improve the high temperature stability thereof.

It is known that many industrial organic substances such as lubricants, fuels, heat exchange fluids, automatic transmission fluids, polymers, such as rubbers and plastics and the like, may break down chemically during use. Two major causes of this chemical breakdown are high temperature exposure and oxidation which can lead to the formation of acidic residues, change in physical properties, carbonaceous deposits and, in the case of fluids, increased viscosity and undue wear of the machinery with which these organic materials are operated. One of the preferred ways of reducing chemical breakdown by oxidation is by adding to an organic composition an agent known as an antioxidant. Antioxidants which are effective at high temperatures are of particular value.

It is the object of this invention to provide novel compounds which are useful as antioxidants. Another object is to provide organic compositions having improved oxidation stability. A further object is to provide lubricating compositions having high temperature oxidation stability. Another object is to provide a method of producing novel compounds useful as antioxidants for organic media. These and other objects will become apparent from the following disclosure.

It has now been discovered that novel multiheterocyclic aromatic oxygen-boron-nitrogen compounds may be prepared and utilized in organic compositions for high temperature oxidation protection. These novel heterocyclic compounds are prepared by the reaction between an organic borate or pyroborate and nitrogen-containing compounds having a hydroxy group and a —C=N— group. It is believed that the boron atom forms a bond with the oxygen atom of the hydroxy group and the nitrogen atom to produce a heterocyclic product.

The preferred borates or pyroborates of this invention are aromatic compounds many of which have been described in U.S. patent application, Ser. No. 504,146 filed Oct. 23, 1965, now U.S. Patent No. 3,361,672. The aromatic borates useful in this invention have the following general structure:

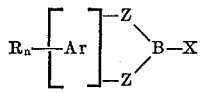

wherien Ar may be o-phenylene, o-naphtylene, 2,2'-diphenylene, 2,2'-dinaphtylene, or 5,6-benzo-2,2'-diphenylene; Z may be oxygen or sulfur, and most preferably oxygen; X may be hydroxy or hydrocarbyloxy, including alkoxy, aryloxy, alkaryloxy and aralkoxy containing from 1 to about 40 aliphatic carbon atoms, or may contain sulfur instead of oxygen, or

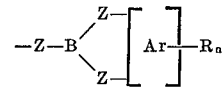

obtained by dehydrating the aromatic borate; R may be alkyl, alkenyl, aryl, aralkyl, alkaryl, cycloalkyl and oxqand halo-substituted groups, wherein R may have from 1 to about 40 carbon atoms; and n is from 0 to any number of available substituent positions for R on the nucleus. When n is 0 the nucleus contains the normal number of hydrogen atoms. Catechol borate is preferred.

As indicated heretofore, the nitrogen-containing reactant is characterized by the presence of a hydroxy group and a —C=N— group wherein the boron atom becomes bonded both to the oxygen and nitrogen atoms to form what is believed to be an N—B—O heterocyclic ring.

One of the preferred nitrogen-containing reactant is an aromatic compound of a salicylaldimine or ketimine class having the structure:

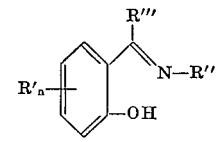

wherein R' and n have the same identity as R and n described above; R" may be hydrogen, alkyl, alkenyl, aryl, alkaryl, aralkyl, cycloalkyl and these substituents may contain non-hydrocarbyl groups, such as hydroxyalkyl, hydroxyaryl, aminoalkyl, pyridinyl or picolinyl and the like containing from 1 to about 40 carbon atoms, and preferably 1 to 20; and R''' may be hydrogen, alkyl, aryl, alkaryl, or aralkyl, having from 1 to about 40 carbon atoms and preferably 1 to 20. Compounds of this class may be prepared by the reaction between salicylaldehydes or o-hydroxy ketones and primary amines.

The primary amines which may be used to produce the salicylaldimines of this invention include mono-amines having alkyl and aromatic radicals, such as aniline, cyclohexylamine, methylamine, ethylamine, butylamine, hexylamine, octylamine, decylamine and the like. In addition, the amines may also include polyamines of the structure

$$H_2N—(R_aNH)_m—H$$

wherein $R_a$ is an alkylene having 1 to 4 carbon atoms or arylene and $m$ is an integer of 0 to about 10. Such polyamines as dipropylenetrimaine, tetraethylenepentamine, pentaethylenehexamine, hexaethyleneheptamine, and the like are included herein. When $m$ is 0, the reactant to form the salicylaldimine is ammonia.

A second class of reactants is the hydroxyquinoline having the structure

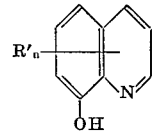

wherein R' and n have the above definitions. The R" of the previous salicylaldimine is part of the quinoline group here. These compounds are prepared by known methods.

The products of this invention are prepared by reacting the aromatic borate or pyroborate with the hydroxynitrogen compound. However, instead of the salicylaldimine, the salicylaldehyde or o-hydroxyaromatic ketone admixed with the primary amine may be employed, if desired, and the reaction can proceed as an in situ reaction.

Thus, the ring structures of this invention contain, aside from the heterocyclic borate group, a 5- to 6-membered —N—B—O-containing cyclic group. For example, the final structure of the product formed using a salicylaldimine or ketimine may be:

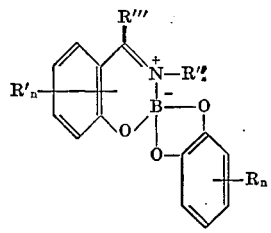

The final structure prepared using the hydroxyquinoline is believed to be as follows:

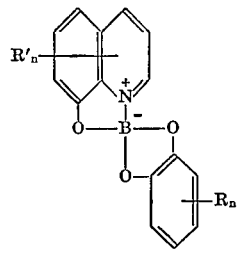

The R and R' groups attached to each of the aromatic rings may be the same or different as desired. The preferred catechol borate is merely used to illustrate the nature of the above structures.

These products are useful in a great variety of organic substances. Organic fluids in which the compounds of this invention may be used include mineral lubricating oils and synthetic lubricating oils. In the latter group are the polyolefin fluids; dicarboxylic esters, such as di-2-ethylhexyl sebacate; esters of trihydric alcohols and monocarboxylic acids, such as trimethylolpropane trioctanoate, and pentaerythritol esters of monocarboxylic acids, such as pentaerythritol tetracaprylate, wherein the monocarboxylic acids have from 1 to 30 carbon atoms; polyacetals, silicone polymeric fluids, polyphenyl ethers, polyglycol ethers, glycol esters and the like. These additives may also be added to greases using many of the above organic fluids as the organic medium with a suitable thickening agent. The additives may be used in elastomeric materials, such as natural rubber, chlorinated rubbers, elastomers produced from polyolefins and chlorinated derivatives. Other polymeric materials which may benefit from the additives of this invention include other plastics normally subjected to oxidation deterioration including polyolefins, such as polypropylene and polyethylene, vinyl-acrylic polymers and the like. The preferred organic medium is a lubricating oil or a grease medium of petroleum base or ester base fluids.

The additives of this invention may be included in the organic compositions in concentrations ranging from about 0.005% to about 15% by weight of total composition.

The following examples are presented to illustrate the invention more clearly although the scope of the invention is not to be limited thereby. Any reference to parts or percents are deemed to be on a weight basis.

EXAMPLE 1

In a suitable reactor equipped with a stirrer, thermometer and a reflux condenser, were added 22 grams (0.2 mole) of catechol, 12.4 grams (0.2 mole) of boric acid in 250 ml. of benzene. The reaction mixture was heated to reflux and water (8.6 grams or 0.48 moles) was removed as an azeotropic mixture with benzene and collected in a condensate trap.

EXAMPLE 2

Into a suitable reactor was added a solution of 38.2 grams (0.2 mole) of N-phenylsalicylaldimine prepared by reacting salicylaldehyde with aniline dissolved in a benzene solution. This solution (27° C.) was added to a benzene solution containing the product of Example 1 (35° C.). The temperature rose to 47° C. and a yellow product started to separate. The reaction mass was refluxed for 150 minutes and water (2.2 grams-0.12 mole) collected in a Dean-Stark trap. The product was filtered off in essentially pure form (58.5 grams; 94.8% yield); M.P. 234–235° C.

Analysis.—Calc'd: N, 4.44%; B, 3.12%. Found: N, 4.38%; B, 3.40%.

A similar product was prepared from salicylaldehyde, aniline and the product of Example 1, using equivalent amounts of each.

EAMPLES 3–10

The product of Example 1 was reacted with a number of salicylaldimines of the structure

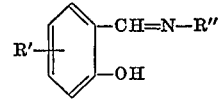

The product analyses of these examples are tabulated below in Table I.

TABLE I

| Examples | | Percent Yield [1] | Product Analysis | | | | | | M.P., °C |
|---|---|---|---|---|---|---|---|---|---|
| | | | N | | B | | Mol. Wt. | | |
| | | | Found | Calc. | Found | Calc. | Found | Calc. | |
| 3 | R'=H, R''=cyclohexyl | 88 | 3.80 | 4.44 | 2.87 | 3.40 | 320 | 340 | |
| 4 | R=H, R''=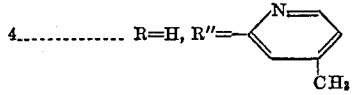 | 74 | 8.20 | 8.50 | 3.22 | 3.33 | | | 170 |
| 5 | R=H, R''=n-$C_4H_9$ | 94 | 3.68 | 4.61 | | | | | 102–103 |
| 6 | R=H, R''=n-$C_8H_{17}$ | 88 | 3.86 | 3.99 | 2.58 | 3.08 | 365 | 351 | |
| 7 | R=H, R''=n-$C_{14}H_{29}$ | 100 | 3.17 | 3.31 | 2.06 | 2.55 | 423 | 423 | |
| 8 | R=H, R''=n-$C_{16}H_{33}$ | 98 | 2.89 | 3.10 | 2.15 | 2.39 | 463 | 451 | |
| 9 | R=H, R''=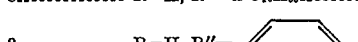—$C_{12}H_{25}$ | 96 | 2.75 | 2.89 | 1.90 | 2.24 | 408 | 483 | |
| 10 | R=($C_{12}H_{25}$)$_3$, R''=phenyl | 80 | 1.71 | 1.73 | 1.00 | 1.34 | 555 | 807 | |

[1] Yield based on water liberated during reaction.

EXAMPLE 11

The product of Example 1 was reacted with 8-hydroxyquinoline by adding 29 grams (0.2 mole) of 8-hydroxyquinoline in 150 ml. of benzene to the said catechol-boric acid product. The reaction mixture was heated to reflux for a period of 120 minutes. The resulting product was filtered off and analyzed. A yield of 83% of the resulting product was obtained having a M.P. of 199–202° C.

*Analysis.*—Calc'd: N, 5.33%; B, 4.11%. Found: N, 4.18%; B, 4.17%.

EXAMPLE 12

Following the procedures of Example 1, a product was obtained by reacting tridodecyl catechol with boric acid. This product was then reacted with 8-hydroxyquinoline following the procedures of Example 2. A yield of over 80% product was obtained:

*Analysis.*—Calc'd N, 1.90%; B, 1.47%. Found: N, 2.13%; B, 1.21%.

EXAMPLE 13

The same tridodecyl catechol-boric acid product of Example 12 was reacted with a salicylaldimine produced from salicylaldehyde and tetraethylenepentamine. The reaction conditions were the same as those of Example 2. The product had the following analysis:

Found: N, 3.93%; B, 1.04%; Mol wt. 1155.

Evaluation of product

The products of this invention were evaluated in a catalytic oxidation test. A sample of the base lubricant is placed in an oven at a desired temperature. Present in the sample are the following metals either known to catalyze organic oxidation or commonly used materials of construction.

|   | Sq. in. |
|---|---|
| (a) Sand-blasted iron wire | 15.6 |
| (b) Polished copper wire | 0.78 |
| (c) Polished aluminum wire | 0.87 |
| (d) Polished lead surface | 0.167 |

Dry air is passed through the sample at a rate of about 10 liters per hour.

One group of additives (A) were tested in a solvent refined mineral oil. A second group (B) was tested in the presence of a pentaerythritol ester prepared from a mixture of monocarboxylic acids. The first group was tested at 325° F. after a 40-hour air treatment and the second group was tested at 425° F. after 24 hours air treatment. The samples are observed for increase in acidity (NN) and kinematic viscosity (KV) before and after treatment, the loss in weight of the lead specimen and the relative amount of visual sludge. The results are tabulated in Tables A and B respectively.

TABLE A

| Additive | Conc., Percent | NN Increase | KV Increase Percent | Lead Loss, mg. | Sludge |
|---|---|---|---|---|---|
| None | | 19.7 | 265 | 220.0 | Medium. |
| Example 6 | 1.0 | 5.9 | 24 | 10.6 | Do. |
|  | 0.5 | 15.7 | 108 | 37.6 | Do. |
| Example 7 | 2.0 | 0.3 | 8 | 0.3 | Light. |
|  | 1.0 | 0.4 | 29 | 0.4 | Do. |
| Example 8 | 2.0 | 0.9 | 7 | 1.0 | Trace. |
|  | 1.0 | 0.7 | 8 | 0.5 | Medium. |
|  | 0.5 | 0.5 | 9 | 0.9 | Trace. |
| Example 9 | 2.0 | <0 | 2 | 0.4 | Do. |
|  | 1.0 | 0.1 | 8 | 0.4 | Do. |
|  | 0.5 | 0.7 | 13 | 0.5 | Do. |
| Example 10 | 2.0 | 0.5 | 21 | 11.2 | Do. |
|  | 1.0 | 0.47 | 16 | 12.7 | Do. |
|  | 0.5 | 12.9 | 168 | 146.0 | Nil. |
| Example 12 | 2.0 | 0.4 | 11 | 49.0 | Trace. |
|  | 1.0 | 0.1 | 9 | 19.6 | Do. |
|  | 0.5 | 9.9 | 70 | 136.0 | Do. |
| Example 13 | 2.0 | 0.5 | 9 | | Light. |
|  | 1.0 | 10.6 | 69 | | Do. |
|  | 0.5 | 18.0 | 160 | | Trace. |

TABLE B

| Additive | Conc., Percent | NN Increase | KV Increase Percent | Lead Loss, mg. | Sludge |
|---|---|---|---|---|---|
| None | | 5.9 | 390 | 17.6 | Nil. |
| Example 2 | 0.5 | <0 | 4 | 0.3 | Light. |
|  | 0.25 | 2.1 | 15 | 0.6 | Nil. |
| Example 6 | 2.0 | 0.8 | 10 | 0.0 | Medium. |
|  | 1.0 | 1.4 | 8 | 0.0 | Light. |
|  | 0.5 | 4.9 | 61 | 0.0 | Nil. |
| Example 7 | 2.0 | 2.1 | 23 | 1.2 | Light. |
|  | 1.0 | 5.1 | 63 | 1.4 | Nil. |
| Example 8 | 2.0 | 0.9 | 11 | 1.6 | Heavy. |
|  | 1.0 | 0.7 | 4 | 1.2 | Nil. |
|  | 0.5 | 4.6 | 59 | 1.0 | Do. |
| Example 9 | 2.0 | 0.1 | 11 | 0.2 | Heavy. |
|  | 1.0 | 4.1 | 58 | 0.3 | Nil.. |
|  | 0.5 | 4.0 | 193 | 0.4 | Do |
| Example 10 | 2.0 | <0 | 26 | 61.5 | Heavy. |
|  | 1.0 | 3.3 | 46 | 23.7 | Do. |
|  | 0.5 | 4.9 | 88 | 16.9 | Nil. |

The above results indicate that the additives of this invention are useful to prevent the chemical breakdown of organic fluids, as well as other organic media. After exposure to high temperatures and air for extended periods of time, uninhibited mineral oils are especially susceptible to oxidation. The addition of a small amount of the novel compounds of this invention reduce the chemical deterioration significantly. These compositions may contain other additives which provide a variety of additional characteristics such as detergents, extreme pressure agents, pour point depressants, additional stability agents, viscosity control agents and the like.

This invention has been described with respect to the specific examples, however the scope of the invention is not limited thereby except as stated in the following claims.

I claim:

1. An organic composition comprising a major proportion of an organic base medium susceptible to chemical deterioration under high temperature oxidation and a minor amount sufficient to inhibit said deterioration of a cyclic N—B—O-containing reaction product produced by reacting (1) an aromatic boron compound of the structure

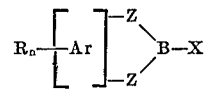

wherein Ar is selected from the group consisting of o-phenylene, o-naphthylene, 2,2'-diphenylene, 2,2'-dinaphthylene, and 5,6-benzo-2,2'-diphenylene; Z is selected from the group consisting of sulfur and oxygen; R is selected from the group consisting of hydrocarbyl and halogen derivatives thereof, having 1 to about 40 carbon atoms; $n$ is from 0 to the number of available substituent positions on the nucleus; and X is selected from the group consisting of hydroxy, hydrocarbyloxy having from 1 to about 40 carbon atoms and

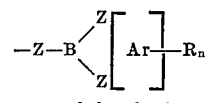

and (2) a nitrogen-containing hydroxy compound selected from the group consisting of

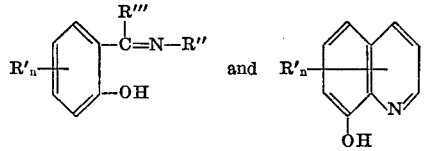

wherein R' has the same definition as R; R" is selected from the group hydrogen, hydrocarbyl, hydroxyhydrocarbyl, aminohydrocarbyl, said hydrocarbyl groups having 1 to about 40 carbon atoms, pyridinyl and picolinyl; and R''' is selected from the group consisting of hydrogen and hydrocarbyl having 1 to about 40 carbon atoms.

2. The composition of claim 1 wherein R and R' are individually selected from the group consisting of alkyl, cycloalkyl, aralkyl, aryl and alkaryl.

3. The composition of claim 1 wherein R'' is selected from the group consisting of hydrogen, alkyl, cycloalkyl, aralkyl, aryl, alkaryl, hydroxyalkyl, hydroxyaryl and aminoalkyl.

4. The composition of claim 1 wherein R'' is alkyl of from 1 to about 20 carbon atoms.

5. The composition of claim 1 wherein R'' is selected from the group consisting of hydrogen, cyclohexyl, phenyl, picolinyl, pyridyl, and para-dodecylphenyl.

6. The composition of claim 1 wherein R is dodecyl and n is 3.

7. The composition of claim 1 wherein the reaction product has the structure

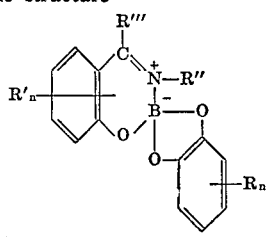

R, R', R'', R''' and n having the definitions previously described.

8. The composition of claim 1 wherein the reaction product has the structure

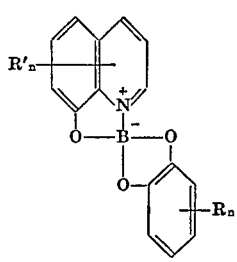

R, R', and n having the definitions previously described.

9. The composition of claim 1 wherein the nitrogen-containing hydroxy compound is a product of salicylaldehyde and tetraethylenepentamine.

10. The composition of claim 1 wherein R'' is a radical derived from a nitrogen compound of the structure $H_2N-(R_a-NH-)_m-H$ wherein $R_a$ is selected from the group consisting of alkylene having from 1 to 4 carbon atoms and arylene, and $m$ is 0 to 10.

11. The composition of claim 1 wherein the nitrogen-containing hydroxy compound is 8-hydroxyquinoline.

12. The composition of claim 1 wherein the nitrogen-containing hydroxy compound is hydroxyquinoline.

13. The composition of claim 12 wherein the nitrogen-containing hydroxy compound is 8-hydroxyquinoline.

14. The composition of claim 1 wherein the boron compound is derived from an aromatic borate selected from the group consisting of aromatic borate and aromatic pyroborate.

15. The composition of claim 14, wherein the aromatic borate is a catechol borate.

16. The composition of claim 1 wherein the major portion is a lubricating oil.

17. The composition of claim 16 wherein the lubricating oil is selected from the group consisting of mineral oils and synthetic ester oils.

18. The composition of claim 17 wherein the synthetic ester oil is a pentaerythritol ester.

References Cited

UNITED STATES PATENTS

| | | | |
|---|---|---|---|
| 3,140,313 | 7/1964 | Kitasaki et al. | 252—49.6 X |
| 3,224,971 | 12/1965 | Knowles et al. | 252—49.6 |

DANIEL E. WYMAN, *Primary Examiner.*

W. CANNON, *Assistant Examiner.*

U.S. Cl. X.R.

44—63; 252—49.6, 400; 260—45.8, 462

PO-1050
(5/69)

UNITED STATES PATENT OFFICE
CERTIFICATE OF CORRECTION

Patent No. 3,442,807            Dated   May 6, 1969

Inventor(s) DEREK A. LAW

It is certified that error appears in the above-identified patent and that said Letters Patent are hereby corrected as shown below:

Column 1, line 67, "wherien" should be --wherein--.
Column 2, line 8, "oxq-" should be --oxy- --.  Column 3, Column 8, Claim 11, "8-hydroxyquinoline" should be --salicylaldimine--.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,442,807          Dated May 6, 1969

Inventor(s) DEREK A. LAW

It is certified that error appears in the above-identified patent and that said Letters Patent are hereby corrected as shown below:

Column 1, line 67, "wherien" should be --wherein--.
Column 2, line 8, "oxq-" should be --oxy- --. Column 3, Column 8, Claim 11, "8-hydroxyquinoline" should be --salicylaldimine--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents